US006860308B2

(12) United States Patent
Archie, Jr. et al.

(10) Patent No.: US 6,860,308 B2
(45) Date of Patent: Mar. 1, 2005

(54) APPARATUS FOR MAKING A TWO-SIDED IMAGE

(75) Inventors: William C. Archie, Jr., Pittsford, NY (US); Frank Pincelli, Rochester, NY (US); Dale F. McIntyre, Honeoye Falls, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 88 days.

(21) Appl. No.: 10/353,664

(22) Filed: Jan. 29, 2003

(65) Prior Publication Data

US 2003/0111183 A1 Jun. 19, 2003

Related U.S. Application Data

(62) Division of application No. 09/685,397, filed on Oct. 10, 2000, now Pat. No. 6,562,171, and a division of application No. 09/686,133, filed on Oct. 10, 2000, now Pat. No. 6,746,051.

(51) Int. Cl.$^7$ .................................................. B32F 1/10

(52) U.S. Cl. ....................... 156/463; 156/461; 493/399; 493/439; 493/443

(58) Field of Search ................................ 156/204, 226, 156/227, 461, 463; 493/396–403, 439, 443, 446

(56) References Cited

U.S. PATENT DOCUMENTS

| | | | | | |
|---|---|---|---|---|---|
| 1,739,328 | A | | 12/1929 | Roesen | |
| 1,944,794 | A | | 1/1934 | Klinger | |
| 2,132,340 | A | | 10/1938 | Grupe | |
| 2,153,846 | A | * | 4/1939 | Rusell et al. | 493/321 |
| 2,224,513 | A | | 12/1940 | Holmlund | |
| 2,292,157 | A | | 8/1942 | Poppe | |
| 3,106,505 | A | * | 10/1963 | Plummer et al. | 156/461 |
| 3,701,522 | A | | 10/1972 | Chi | |
| 3,743,273 | A | | 7/1973 | Katz et al. | |
| 3,850,085 | A | * | 11/1974 | Klemm | 493/131 |
| 3,865,668 | A | | 2/1975 | Holson | |
| 3,897,943 | A | | 8/1975 | Head et al. | |
| 3,899,381 | A | | 8/1975 | O'Brien et al. | |
| 3,956,049 | A | | 5/1976 | Johnsen | |
| 3,982,746 | A | | 9/1976 | O'Brien et al. | |
| 4,012,268 | A | | 3/1977 | Johnsen | |
| 4,410,390 | A | | 10/1983 | Farrell | |
| 4,420,148 | A | | 12/1983 | Meadows | |
| 4,461,661 | A | | 7/1984 | Fabel | |
| 4,576,461 | A | | 3/1986 | Silverberg | |
| 4,812,074 | A | * | 3/1989 | Ausnit et al. | 493/213 |
| 5,181,901 | A | * | 1/1993 | Volkert | 493/331 |
| 5,213,560 | A | | 5/1993 | Crowley | |
| 5,403,428 | A | | 4/1995 | Shingo et al. | |
| 5,791,692 | A | | 8/1998 | Manico et al. | |
| 5,904,030 | A | | 5/1999 | Kavanagh | |
| 5,957,502 | A | | 9/1999 | Manico et al. | |
| 5,980,442 | A | | 11/1999 | Hamilton et al. | |
| 6,004,061 | A | | 12/1999 | Manico et al. | |
| 6,042,672 | A | | 3/2000 | Kishine et al. | |
| 6,059,912 | A | | 5/2000 | Kellogg et al. | |
| 6,173,992 | B1 | | 1/2001 | Manico et al. | |
| 6,435,562 | B1 | | 8/2002 | McIntyre et al. | |

FOREIGN PATENT DOCUMENTS

| | | |
|---|---|---|
| FR | 2757796 | 7/1998 |

* cited by examiner

*Primary Examiner*—Blaine Copenheaver
*Assistant Examiner*—Barbara J. Musser
(74) *Attorney, Agent, or Firm*—Frank Pincelli

(57) ABSTRACT

A method and apparatus for the manufacture of a two-sided image product is disclosed, comprising the steps of: providing a web of media having an image bearing side and a non-image bearing side; printing a plurality of undetermined images on the image bearing side; applying an adhesive to the non image bearing side; moving the web of media in a direction longitudinal to the web; forming a crease line on the web of media, the crease line running in the longitudinal direction along the web; and folding the web of media along the crease line so that the non-image bearing side contacts itself so as to adhere the non-image bearing side to itself.

12 Claims, 13 Drawing Sheets

APPARATUS FOR MAKING A TWO-SIDED IMAGE

CROSS REFERENCE TO RELATED APPLICATIONS

This is a divisional of application Ser. No. 09/685,397, filed Oct. 10, 2000, now U.S. Pat. No. 6,562,171.

U.S. Ser. No. 09/686,133, filed Oct. 10, 2000, now U.S. Pat. No. 6,746,051, entitled "A TWO SIDED IMAGE PRODUCT" to William C. Archie et al.,

FIELD OF THE INVENTION

This invention is in the field of apparatus and methods of manufacture of image products and, more particularly, in the field of apparatus and methods for continuous manufacture of two-sided image products.

BACKGROUND OF THE INVENTION

Until recently the majority of photographic images were supplied to consumers in the form of the familiar silver halide-based photographic print consisting almost always of just one image printed on one side of a paper or paper-like medium. While the venerable photographic print has served the marketplace well for over a hundred years, the advent of new digital printing technologies utilizing silver halide media and other newer print media has enabled the printing of a much greater variety of photographic image bearing products. For example, the capability now exists to easily compose and print multiple images on a single sheet. One recent example which capitalizes upon these capabilities to generate novel image products is disclosed in the series of U.S. Pat. Nos. 5,791,692; 5,957,502, 6,004,061, 6,435,562, and 6,173,992. This series of patents discloses various aspects of dual sided photoalbum sheets and methods of making them by folding image bearing print media over on itself and adhering the folded sheet together to create an attractive two-sided page with desirable properties. The methods disclosed by Manico, while very useful, do not lend themselves to the manufacture of two-sided image bearing sheets in a continuous manner. Such a continuous method would lend itself much better to high volume, low-cost manufacturing of not only two-sided album pages, but also a variety of other two-sided image-bearing products.

SUMMARY OF THE INVENTION

In accordance with one aspect of the present invention there is provided an apparatus for manufacture of a two-sided image product, comprising transport means for moving a web of media in a direction longitudinal to the web, the web having an image bearing side and a non-image bearing side with a plurality of undetermined images printed on the image bearing side, and the non-image bearing side having an adhesive thereon; means for applying adhesive to the non-image bearing side of the web of media; a creasing device for forming a crease line on the web of media, the crease running in the longitudinal direction along the web; and a folding device for folding the web of media along the crease so that the non-image bearing side contacts itself so as to adhere the non-image bearing side to itself.

In accordance with another aspect of the present invention there is provided a system for making customized two sided image products for a plurality of customers, comprising:

a computer for coordinating a plurality of customer orders for custom image products having image content;

a digital printer for printing the image content of the customer orders on an image bearing side of a web of media, the web having a non-image bearing side;

an adhesive applying mechanism for applying an adhesive on the non-image bearing side of the web;

a folding mechanism for folding the web such that the non-image bearing side contacts itself;

a cutting mechanism for cutting the folded web for separating the custom image products from the web.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
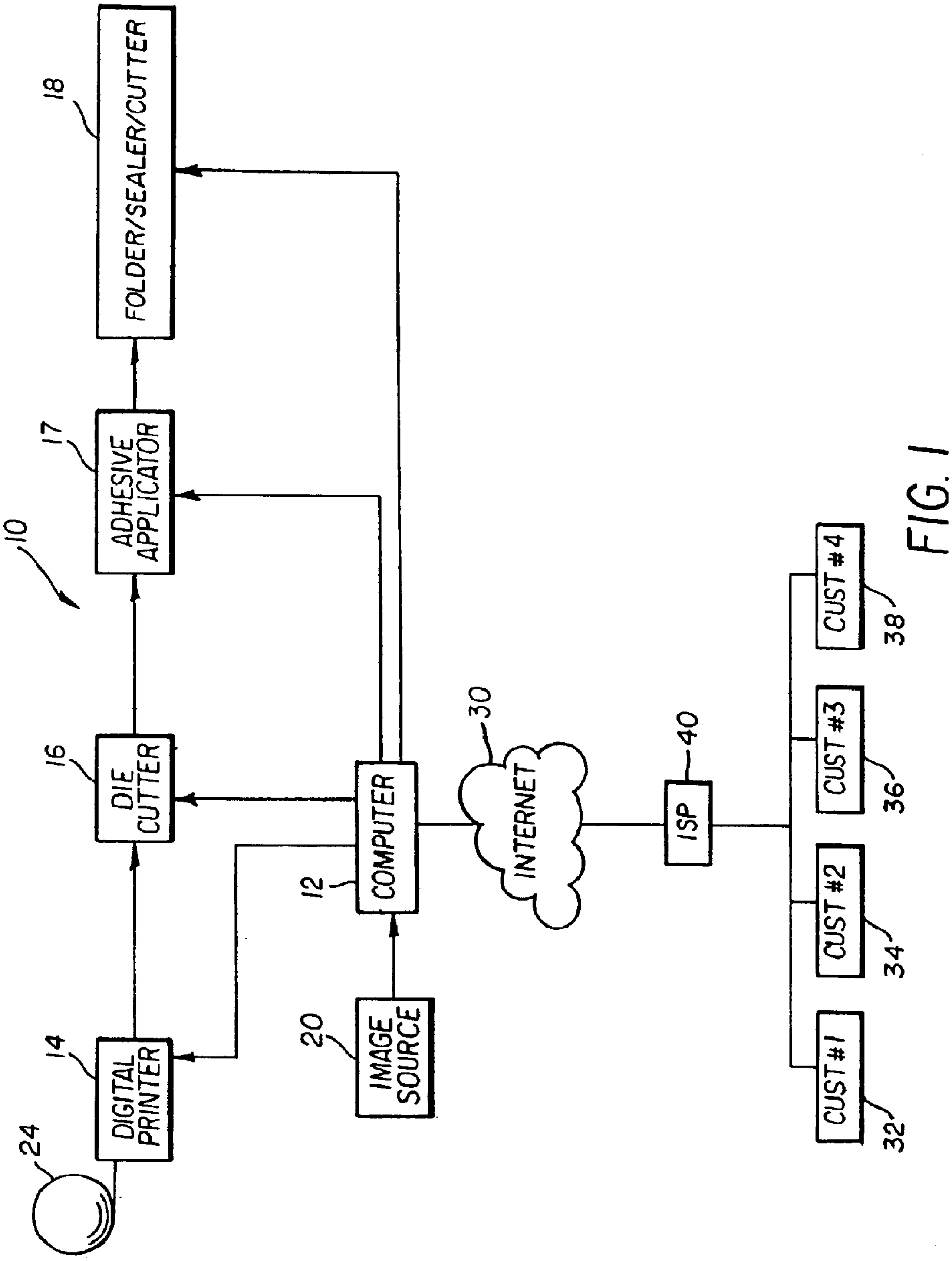
FIG. 1 shows a schematic block diagram of a continuous manufacturing system for two-sided image products made in accordance with the present invention.

The present invention is directed to a continuous manufacturing system in which a continuous web of printed media is passed through folding apparatus where the web is folded, sealed and cut so as to provide a plurality of individual image products for a plurality of different custom orders. The present invention preferably uses the capability of digital printing technology to efficiently create a stream of two-sided image products, each one having a unique set of images on it. FIG. 1 shows a block diagram illustrating the components and operation of such a continuous manufacturing system 10 made in accordance with the present invention. In FIG. 1, the system 10 includes a computer 12 which is connected to and controls and/or provides information to the other system components. In the embodiment illustrated system 10 includes a digital printer 14, die cutter 16, adhesive applicator 17, a folder/cutter/sealer 18 of the present invention, and image source. In operation, digital image files supplied by image source 20 are composed and laid out appropriately for the particular product being produced by composition software running on computer 12. The image files and layout instructions are sent to digital printer 14 which prints them continuously on a roll (web) of print media 24 (such as photographic paper which is then processed by an appropriate processor (not shown)), taking into account the relative position of images and any cuts and/or folds which will be introduced in the web for producing image products. After printing and processing, the continuous web of print media 24 is sent to die cutter 16 where any cuts are made in the web 24, according to instructions received from computer 12. Next, the continuous web of printed media 24 is transported past adhesive applicator 16 where adhesive is applied in designated areas, also under control of computer 12. The adhesive applicator 16 may be a separate device or part of the folder cutter 18. Finally, the web 24 passes through the folder/sealer/cutter 18 of the present invention, resulting in finished two-sided image products such as two-sided photo album pages or other products as described below. The folder/sealer/cutter 18 is in communication and/or control of the computer 12 as are the other system components mentioned. The digital printer may place printed fiducial marks (not shown) on the web, preferably along one edge of the web, or a die cutter may place holes (not shown) along the edge of the web for locating positions where the web is to be cut. Sensors (not shown) in the folder/sealer/cutter 18 of a well known mechanical or optical type sense the presence of the fiducial marks or holes and send signals via the computer therein (or computer 12) to operate the cutter to cut the folded and sealed web into separate image product pieces at the appropriate points along the web.

As illustrated by FIG. 1, computer 12 may also be in communication with the internet 30 for receiving product orders from a variety of remote locations 32, 34, 36 and 38. As illustrated the remote locations communicate though a local internet service provider (ISP) 40. Locations 32, 34, 36 and 38 may comprise any source that can communicate product for customer orders, for example, but not by way of limitation, individual customer, retail establishments, other printing or photofinishing service providers. Computer 12 can also keep track of the orders and place any desired order tracking information on the web that can be used for tracking, collating, and returning the image products to the appropriate customer.

Figure 2A:
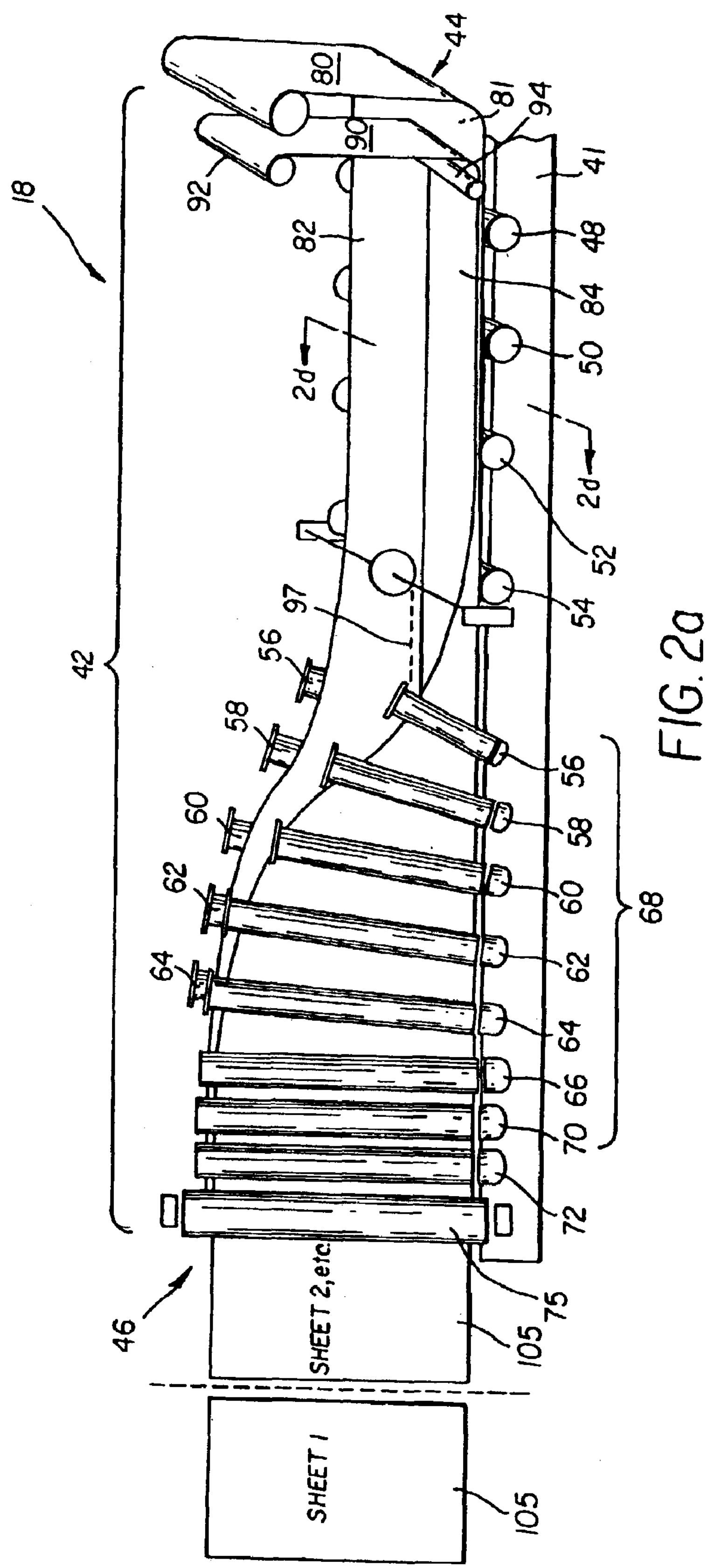
FIG. 2*a* is an illustration showing a perspective view of an apparatus in accordance with the present invention.

FIGS. 2*a*–2*c* and 3 depict in greater detail an embodiment of a folding, sealing and cutting apparatus 18 made in accordance with the present invention. FIG. 2*a* illustrates an elevational view of the apparatus 18. The apparatus 18 has frame 41 that defines a processing path 42 having an entrance 44 and exit 46. The frame 41 supports transport rollers 48, 50, 52 and 54, guide roller pairs 56, 58, 60, 62, 64 and 66 within folding section 68, driving rollers 70, sealing rollers 72, and cutter 75. A media web 80 enters the apparatus through entrance 44 from the right in FIG. 2*a* and proceeds through the apparatus 18 from right to left. Web 80 has an image-bearing side 81, shown facing down in FIGS. 2*a* and 2*c*, having at least one image (not shown) pre-printed on it, and a non-image-bearing side 82, shown facing up in FIGS. 2*a* and 2*c*. The images may be printed on the image-bearing side 81 by any of a number of printing methods including, preferably digital printing including for example, CRT or laser printing where media web 80 is silver halide media, or ink-jet printing where media web 80 is ink-jet media, or thermal or electrophotographic printing where media web 80 is electrophotographic or thermal media respectively.

An important advantage of using digital printing technology in the present invention is the ability the technology confers to print a continuously changing stream of different images on the image-bearing side of the web 80. Such a stream of different images is herein referred to as a series of undetermined images, to more clearly distinguish this type of operation from one where a stream of identical images are being printed such as in a conventional high speed press operation for printing publications, brochures, etc. The ability to print such a series of undetermined images lends itself well to the continuous production of personalized two-sided image bearing products such as photo album pages, or other image bearing products where each page of product is unique and bears images unique to a particular customer for the products. Another advantage of using digital printing technology in the present invention is that this technology enables images to be sized and positioned anywhere on the image bearing side of the web. This is important not only in the production of photo album pages where a variety of layouts of images may be desired by the customer, but also for precise positioning of images with respect to where the web will be later be creased and folded to form a variety of other two sided image bearing products, such as those illustrated in the embodiments described later.

Figure 2D:
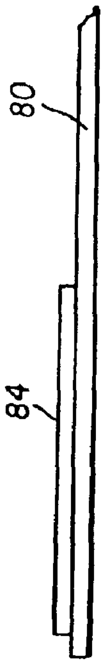
FIG. 2*d* is an enlarged cross sectional end view of a of the apparatus of FIG. 1*a* as taken along line 2*d*—2*d;*

Web 80 also has adhesive area 84 applied to its non-image bearing side 84 prior to entering the apparatus. FIG. 2*d* illustrates an enlarged partial cross sectional view of the web 80 as taken along line 2*d*—2*d* with the adhesive area 84 present. The adhesive area 84 may comprise a sheet (layer) of adhesive, for example such as photographic dry-mount adhesive tacked to the web or a coatable adhesive applied continuously to the desired portion of the web prior to entry into the folding apparatus to enable sealing after folding has taken place. The application of an adhesive to a moving web is well known and could be accomplished by a number of techniques including, for example, a coating station with a roll coater, a blade coater, spray coater, or extrusion hopper, or at a tacking station where an adhesive web is continuously tacked to the web as it passes the station. In the embodiment illustrated, a web 90 of adhesive material is laid atop one side of the web 80. The web 90 is supplied from a roll 92. An application roller 94 is used for applying a sufficient force for adhering the web 90 to web 80. In the embodiment illustrated, the web 90 and the adhesive material is heat activated so that it can easily be handled prior to sealing. Alternatively, a dry heat-activated adhesive may have been applied to the media web 80 at an earlier stage.

As shown in FIG. 2*a*, in the operation of the apparatus 18, media web 80 is transported through the apparatus by driving rollers 70 that grip the folded web 80 and pulling it through the apparatus 18. The transport of media webs through machines for folding or cutting or other purposes is well known and means other than the one illustrated may be used. For example, a number of rollers in the machine could be driven pinch rollers which would act to transport the web 80, or a vacuum drive belt or belts could also be used. Since the reverse face 81 of web 80 typically has images printed on it and is also the side of the web contacting the machine, it is important not to damage the image side 81 of the web and the surfaces contacting the web should be made of materials which would not inflict damage by, for example, scratching or marring it. Rollers covered with a rubber such as neoprene or any soft rubber or polymer or other conformable material would be particularly useful in this application. Other surfaces in the apparatus which contact the web 80 may be advantageously coated with Teflon® or other very smooth material with a low coefficient of friction. If desired, air bearings may be provided (not shown) which would allow the web 80 to be "floated" or "flown" over portions of the machine to minimize damage to the web 80.

Figure 2B:
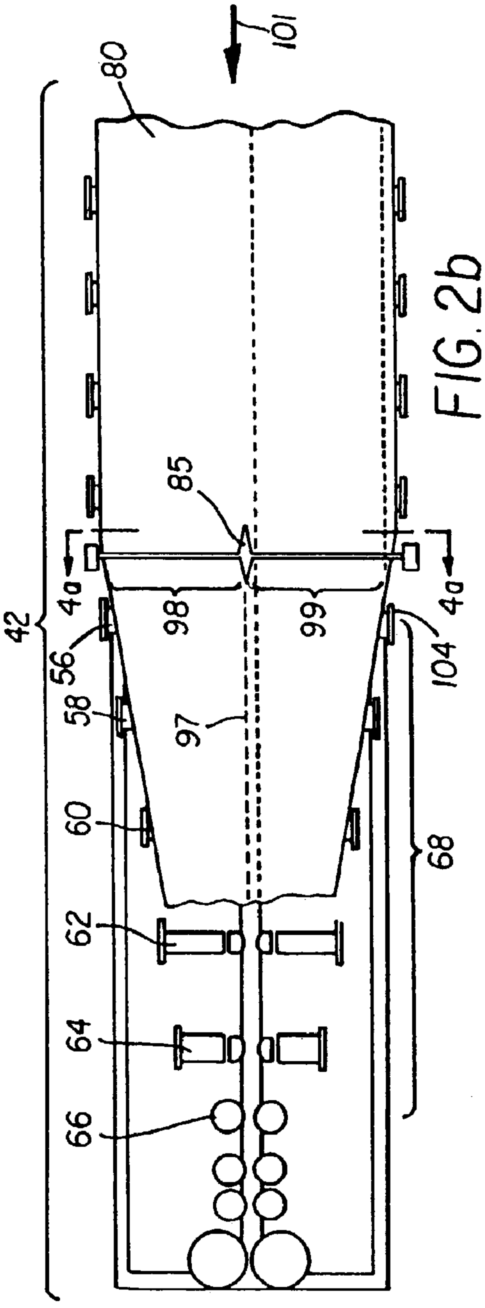
FIG. 2*b* is a top view of the apparatus of FIG. 2*a* with a media being processed.
Figure 2C:
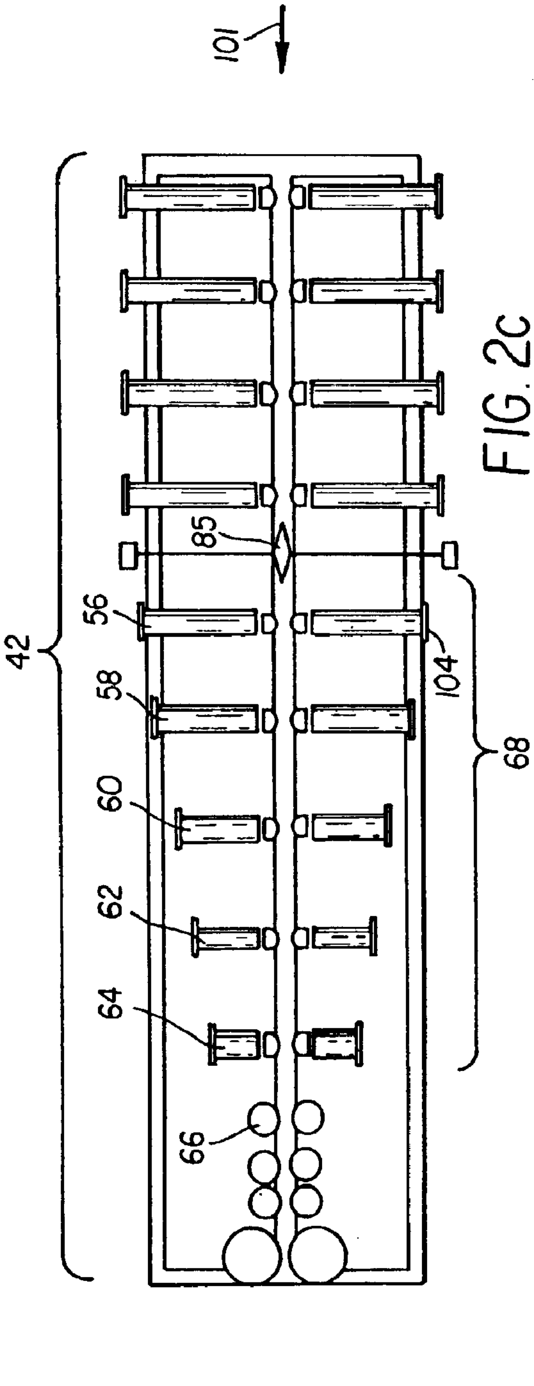
FIG. 2*c* is a view similar to FIG. 2*b* without the media.
Figure 3:
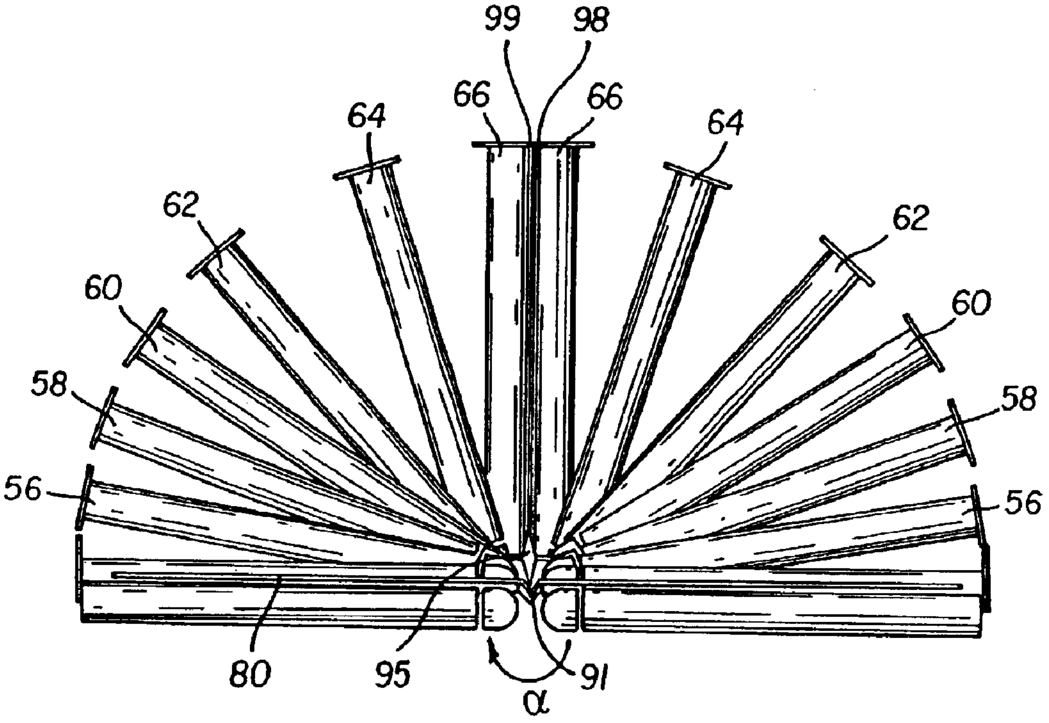
FIG. 3 is an end view of the apparatus of FIG. 1 as taken along line 2*d*—2*d;*

As can be seen by reference to FIGS. 2*a*–2*c* and 3 folding of the web 80 begins as it passes under creasing roller 85 which presses the web against die 91 thereby creating a crease line 97 and forming two sections 98 and 99 that are to be folded toward each other. Next, as the web 80 moves along processing path 42 in the direction indicated by arrow 101, it passes into folding section 68 which comprises a series of guide roller pairs 56, 58, 60, 62, 64 and 66 for bringing sections 98 and 99 together. Referring to FIG. 3, it may be more clearly seen that the angle α between the roller pairs decrease progressively from 180 degrees to an angle of substantially 0 degrees as the web 80 is drawn through them, thereby folding the web 80 along the crease line 97. In the embodiment illustrated, each of the roller pairs 56, 58, 60, 62, 64 and 66 has a guide flange 104 at the end to constrain the web 80 as it is moving along the processing path 42.

Figure 4A:
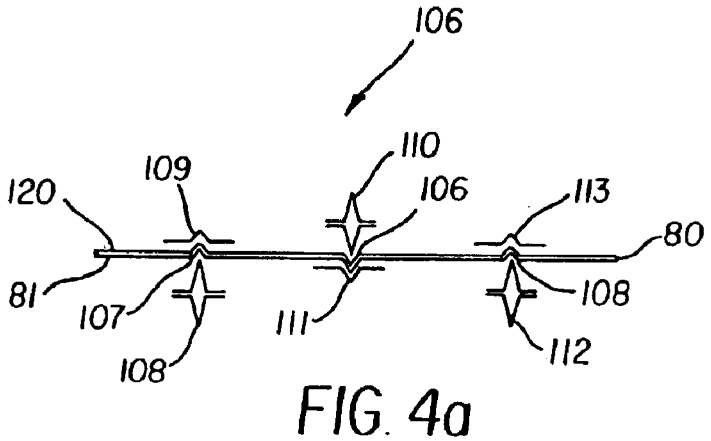
FIG. 4*a* is a cross section view of the apparatus of FIG. 2*b* as taken along line 4*a*—4*a* illustrating a modified creasing mechanism made in accordance with the present invention.
Figure 4B:
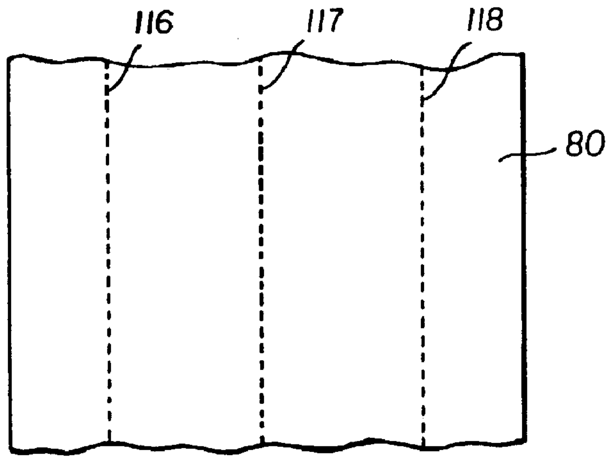
FIG. 4*b* is a top view of a portion of the media web which has been creased by the creasing mechanism of FIG. 4*a;*
Figure 4C:
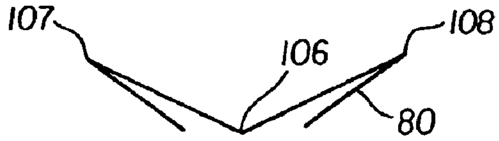
FIG. 4*c* is an end view of the portion of FIG. 4*b* which has been folded along crease lines introduced by the mechanism of FIG. 4*a;*

While FIGS. 2*a*–2*c* and 3 illustrate a folding operation in which the web 80 is folded substantially in two equal sections 98 and 99, it will be appreciated that apparatus 18 could easily be constructed which would place the longitudinal crease line 97 at a position other than the longitudinal center line of the web 80 and that this would allow the web 80 to be folded in a position other than the center. It will also be appreciated that more than one crease line could be introduced into the web 80 at different positions across the web and that these crease lines could be introduced on either the image-bearing or non-image bearing sides of the web, or both. By way of an illustration of this latter possibility, FIG. 4*a* provides a detailed view of an alternative creasing section which may be used in the apparatus of FIG. 2*a*. The modified creasing mechanism 106 comprises creasing rollers 108, 110, and 112 and associated dies 109, 111 and 113 arranged to introduce three creases lines 116, 117 and 118 into the web 80. In FIG. 4*a*, roller 110 and die 111 cooperate to introduce crease line 117 on the non-image bearing side 120 of web 80, while the combinations of roller 108 with die 109 and roller 112 with die 113 introduce crease lines 116 and 118 respectively into the image-bearing side 81 of web 80. FIG. 4*b* shows a top view of web 80 as it appears after passing by the creasing mechanism 106 depicted in FIG. 4*a*; the positions of crease lines 116, 117 and 118 are shown in FIG. 4*b*. The multiple crease lines thus introduced then enable web 80 to be folded at more than one place as shown in FIG. 4*c* which depicts an end view of web 80 folded along crease lines 116, 117 and 118.

Returning to FIGS. 2*a*–2*c*, a pair of sealing rollers 72 are provided for adhering the two sections 98 and 99 together. Rollers 72 apply pressure to cause sections 98 and 99 of the folded web to adhere to each other permanently (see FIG. 3). For certain types of adhesive, for example, photographic dry-mounting adhesive or other heat-activatable adhesives, it may be desirable to apply heat in addition to pressure during the sealing step. The application of heat and pressure can be supplied by a pair of opposed heated rollers, or heat may be applied to the web by some technique separate from the rollers such as, for example, by contacting the web with a heating bar, by radiant heating by a heating element, by directing heated air at the web, or by the use of microwave energy simultaneous with, or separate from the application of pressure.

Figure 10:
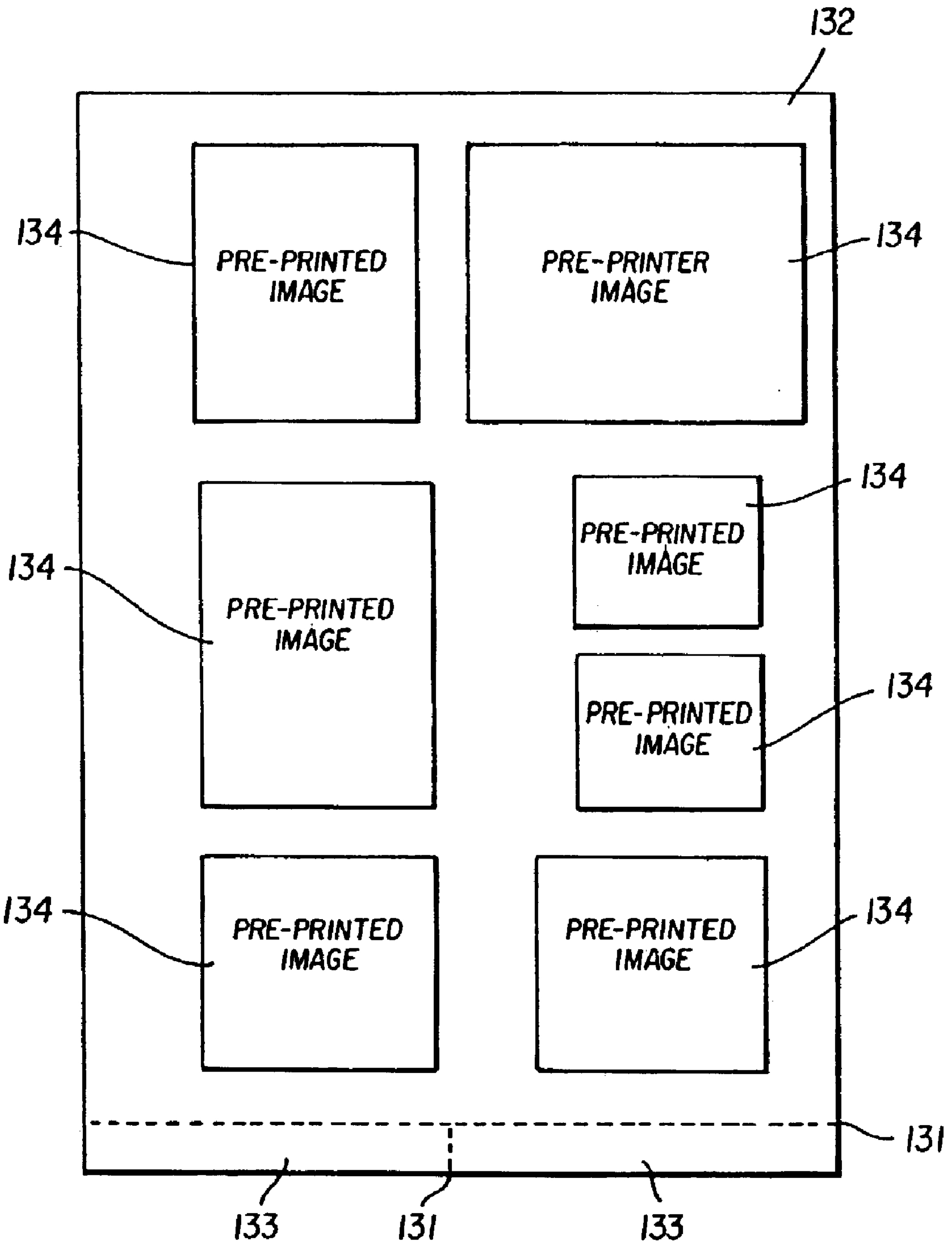
FIG. 10 shows a plan view of one side of a two-sided album page made in accordance with the present invention.

Referring to FIGS. 2*a*–2*c*, once the sections 98 and 99 have been sealed to each other, the folded web is cut using cutter 75 into appropriate size sheets 105 at predetermined locations, for example two-sided album pages FIG. 10 illustrates a plan view of one side of such a two-sided album page 132 with pre-printed images 134. In addition, perforations 131 may be provided on album page 132 for allowing optional removable segments 133 that can be removed later by the service provider or the customer. Segments may have information that has been printed there that may be used for processing of the image goods, such as a customer order number or a customer mailing label. Any of a number of cutting devices are useful as the cutter 75 including, but not limited to, motor driven rotary or sliding knife cutters, guillotine cutters, rotary die cutters, or laser cutters. Suitable machine controls (not shown) are connected to the cutter 75 in order to activate it at appropriate intervals along the web 80 to provide cut section to the desired size and at the appropriate location. As is well known in an automatic or semi-automatic machine of this type, the machine controls may be programmable by an operator to cut a particular number of sheets of a particular size, or the controls may be automatically interlinked with sensors (not shown) in the machine which sense cutting marks such as printed fiducial marks or punches placed on or in the web, usually along one of the edges, by the printer to signal where cuts should be made. The apparatus 18 may also usefully have any of a number of known sheet collection devices attached such as collection bins or automatic collators, as for example typically seen at the end of a copying machine. An automatic collator may easily be interconnected with and be responsive to the machine controls (or computer 12) so as to collect and collate cut sheets. In addition to marks placed by the printer to indicate cutting positions, as discussed above, the printer 14 may also place along one edge marks and/or text relating to the sorting or collating or an order and/or identifying an order with a particular customer. this information may even include an address label where the product is to be delivered.

Figure 5A:
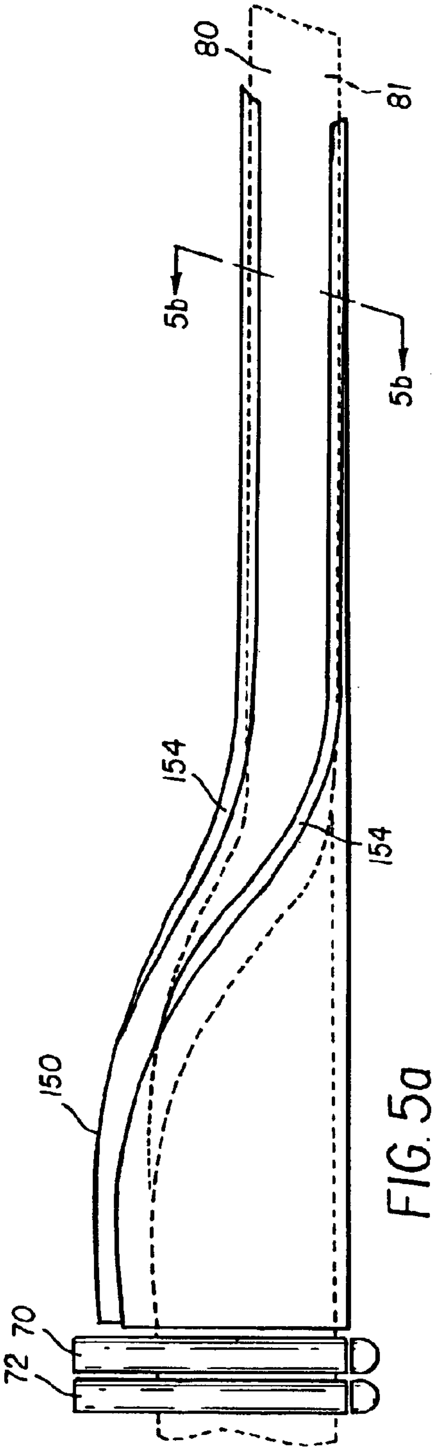
FIG. 5*a* is an elevational view of an alternative folding guide of an apparatus in accordance with the invention.
Figure 5B:
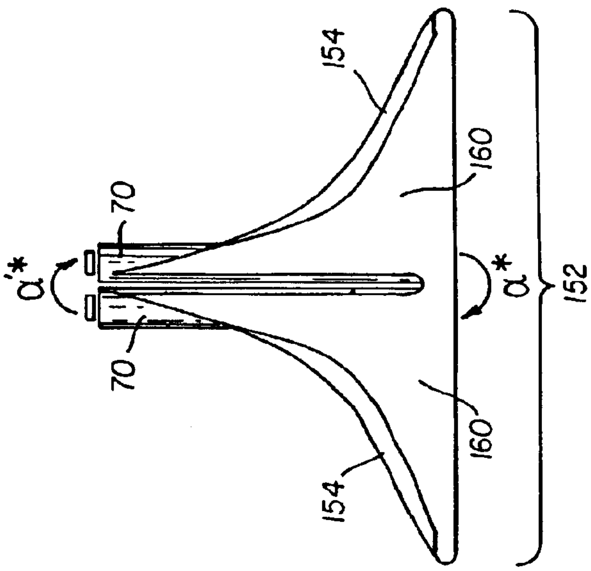
FIG. 5*b* is a cross sectional view of the folding guide of FIG. 4*a* as taken along line 5*b*—5*b;*

FIGS. 5*a* and 5*b* illustrate elevational and end views, respectively, of an alternative embodiment of the folding section of the apparatus 18 as previously set out above. In this alternative embodiment, the folding section 68 of FIG. 2*a* is replaced with a V-shaped guide channel 150 having generally V shaped mouth 152. The guide channel 110 forms a generally V-angle α of substantially 180 degrees which decreases along the channel while progressing from right to left in FIG. 5*a* until it reaches a V-angle α* of substantially 0 degrees. In operation, a media web 80 (shown in FIG. 5*a* by dashed lines) may be transported through the guide channel 150 by driving rollers 70. Looking at FIG. 5*a*, the web 80 enters the guide channel 150 at the mouth 152 on the right and as it passes through the channel from right to left, is continuously folded on itself. Flanges 154 at the edges of guide channel 150 serve to constrain the web 80 as it passes through the channel 150. Once the web 80 is folded, the web 80 is sealed by the action of pressure rollers 70. In this embodiment, the image-bearing side 81 of the web 80 contacts the inner surface 160 of the guide channel 150; therefore it is preferable that these surface 160 be smooth, for example polished metal, or be coated with a very smooth slippery material such a Teflon®.

The embodiments of the invention so far disclosed have all described the continuous folding and adhering to itself co-extensively of a simple web bearing at least one image to form a two-sided image bearing entity which is then cut transversely across the web into separate folded image products. It should be understood that the present invention also comprises the folding of an image bearing media web on itself and adhering to itself only at certain areas, for example only along one edge, or in a striped pattern, or in specific patches. The areas of adhesion of the folded web can be controlled by a variety of techniques, for example but not by way of limitation, by placing adhesive only in certain areas prior to folding. Further, the media web can also be pre-cut at certain locations prior to folding so as to produce a variety of two-sided image bearing products.

Figure 11:
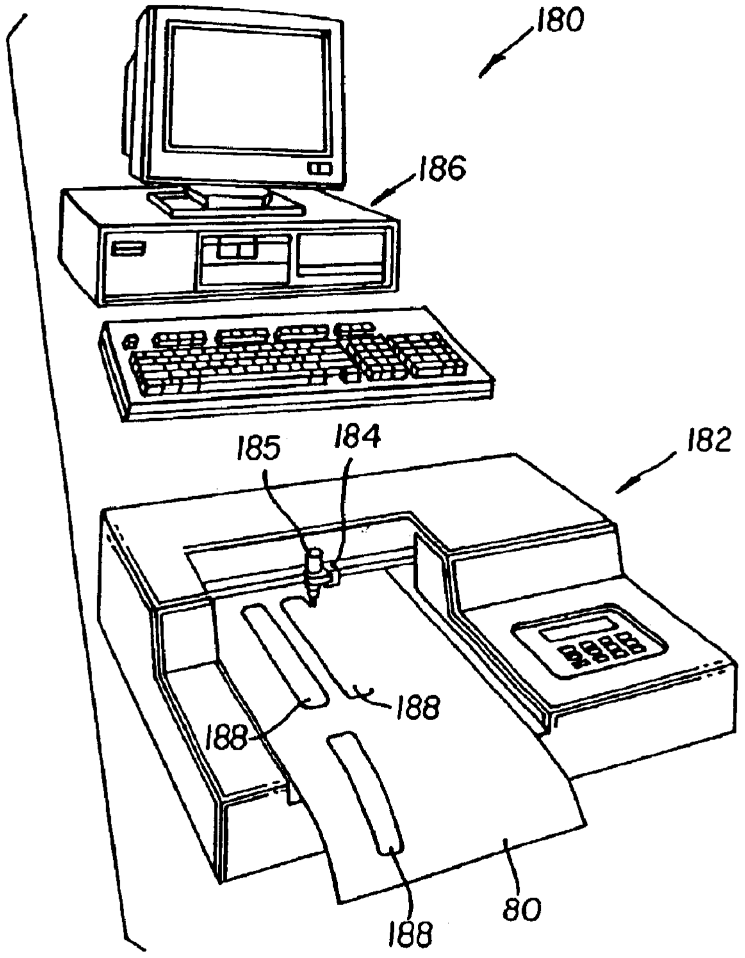
FIG. 11 is a system diagram for a web cutter made in accordance with the present invention.
Figure 11A:
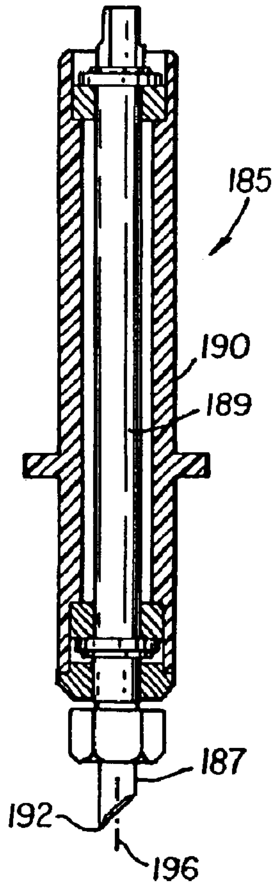
FIG. 11*a* is a cross-section of a knife pen useful in the system of FIG. 11.

Pre-cutting of the web or an adhesive sheet such as photographic dry-mount tissue prior to the folding steps can be accomplished by any of a number of methods including, for example but not by way of limitation, die cutting or by a numerically controlled cutting device such as a laser cutter. A particularly useful method and system for introduces cuts in an image bearing web or adhesive sheet is disclosed in U.S. Pat. No. 5,438,896. FIG. 11 depicts the system 180 of the '896 patent where a x, y plotter 182 has pen carrier 184 fitted with knife pen 185. Plotter 182 is under the control of computer 186 (which alternately may be computer 12) which has been programmed to send commands for cutting shapes 188 in web 80. FIG. 11*a* shows a detailed cross-sectional drawing of knife pen 185 where knife blade 187 is mounted on shaft 189. Shaft 189 is rotatably mounted in pen barrel 190. In operation, knife blade 185 is mounted so that cutting point 192 is not on axis with center-line 196, but trails slightly so that when the direction of travel is changed, blade 185 rotates to adjust to the new cutting direction. A system such as that of FIG. 11 can be used to introduce cuts in an image bearing web or in an adhesive sheet as an off-line operation after the web has been printed with images, but prior to introducing the web to the folder/sealer of FIG. 2*a*. Alternatively, a system like that of FIG. 11 can be adapted to place cuts in a web in an in-line operation as part of a system for a continuous manufacturing operation such as that described earlier for FIG. 1.

Figure 6A:
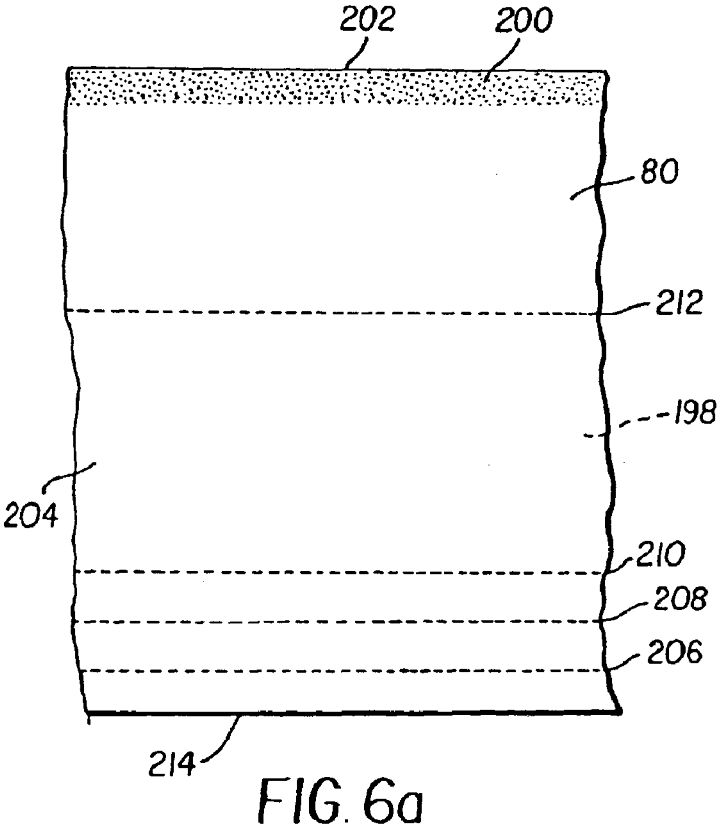
FIG. 6*a* is a top plan view of a portion of the media web of FIG. 1 having crease lines such that when folded will make a two sided image product made in accordance with the present invention.
Figure 6B:
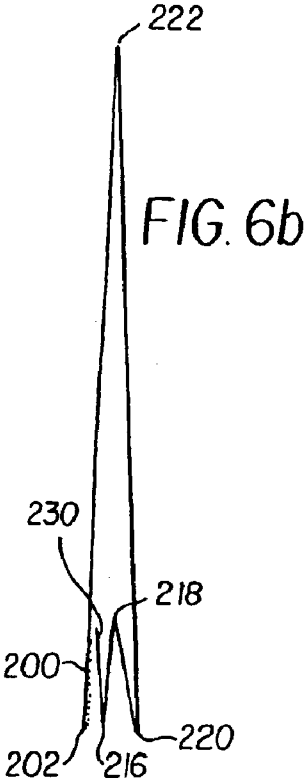
FIG. 6*b* is an enlarged cross section view of the web of FIG. 6*a* that has been folded along the crease lines.
Figure 6C:
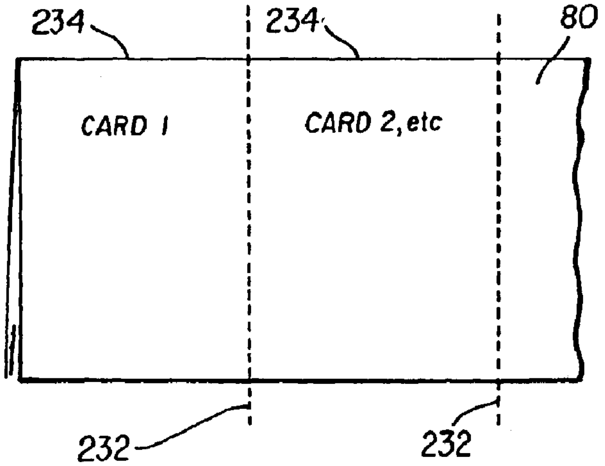
FIG. 6*c* is top plan view of the folded web of FIG. 6*b* illustrating separation lines for making individual image products.
Figure 6E:
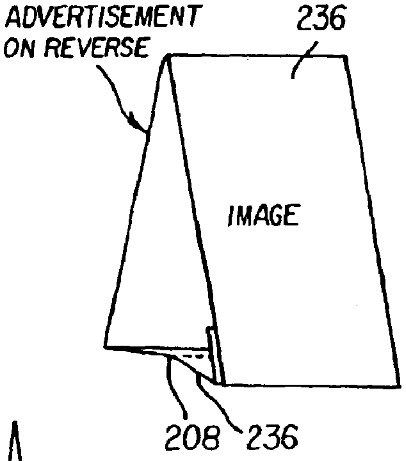
FIG. 6*e* is a perspective view of the image product of FIG. 5*d;*
Figure 6D:
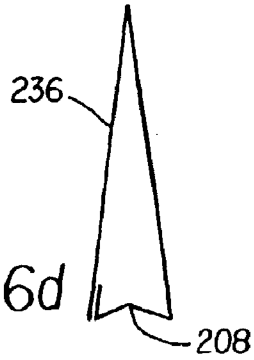
FIG. 6*d* is a side view of a separated image product of FIG. 5*c;*

The following products described will serve to illustrate examples of such image products employing variations in areas of adhesion and pre-cutting as just described. FIGS. 6*a*–6*e* depict a two-sided photo "tent card" made in accordance with the method and apparatus of the present invention. FIG. 6*a* shows the media web 80 prior to folding and sealing by the method and apparatus of the present invention. The web 80 has been pre-printed with images (not shown) on its reverse face 198 in areas of the web 80 which will form the outer, visible portion of the tent card once it has been folded. Web 80 also has a continuous stripe area 200 of adhesive applied along the outer edge 202 on the upper face 204 of the web 80. Crease lines 206, 208, 210 and 212 are shown as introduced by an apparatus such as that illustrated in FIG. 4*a*. Folds are then formed sequentially by a series of folding operations such as those disclosed in either FIG. 2*a* and FIG. 3 or FIGS. 4*a*–4*b*. Referring to FIGS. 6*b* and 6*a*, and using any of the folding methods previously disclosed, a first fold 216 is made along crease line 206 by folding the edge 214 over the upper face of the web 80, where the upper face is that face showing in FIG. 5*a*. A second fold 218 is made along crease line 208 by folding the previously folded web under toward the reverse face of web 80. The third fold 220 is made along crease line 210 by folding all the previous folds over the upper face of the web 80. Finally, the fourth and last fold 222 is made along crease line 212 by folding the edge 202 over the upper face of web 80. FIG. 6*b* represents an enlarged end view of the web 80 after it has been folded as described along crease lines 206, 208, 210 and 212 of web 80 in FIG. 6*a*. Referring again to FIG. 6*b*, the edge 202 of web 80 is next sealed to the flap 230 created by the fold 216 along line 206 by activating adhesive stripe 200, previously provided on web 80, using pressure and/or heat as previously disclosed. FIG. 6*c* shows the web 80 after it has been folded and sealed; lines 232 indicate where the continuous web 80 is cut so that the individual tent cards 236 can be produced. FIGS. 6*d* and 6*e* represent end and isometric views respectively of the completed tent cards 236 which have been unfolded along line 208 to form a base 238 and allow the cards 236 to stand upright.

Figure 7A:
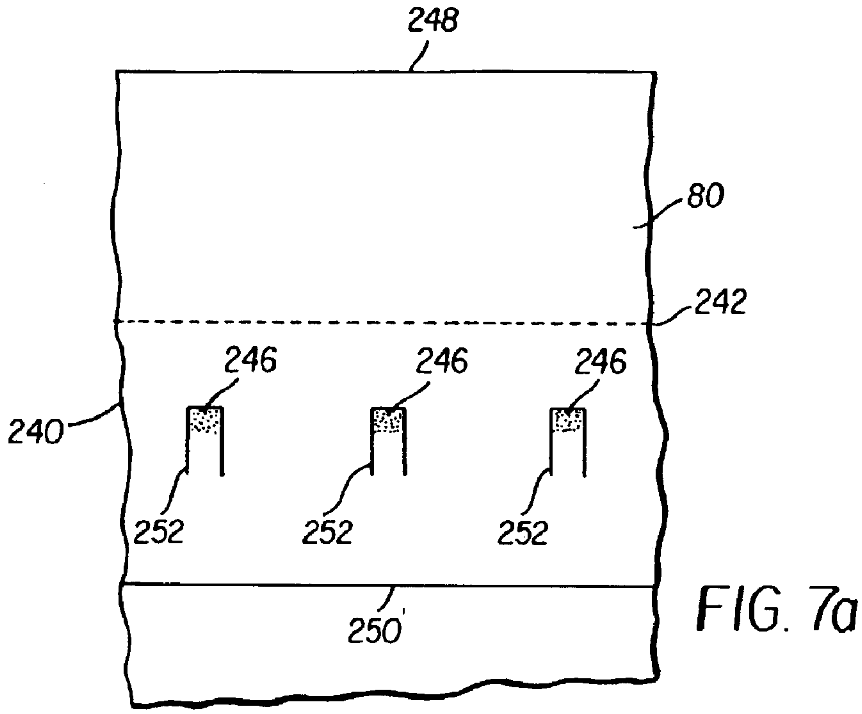
FIG. 7*a* is a top plan view of an alternate web made using the apparatus of FIG. 1 for making a modified two sided image product made in accordance with the present invention.
Figure 7B:
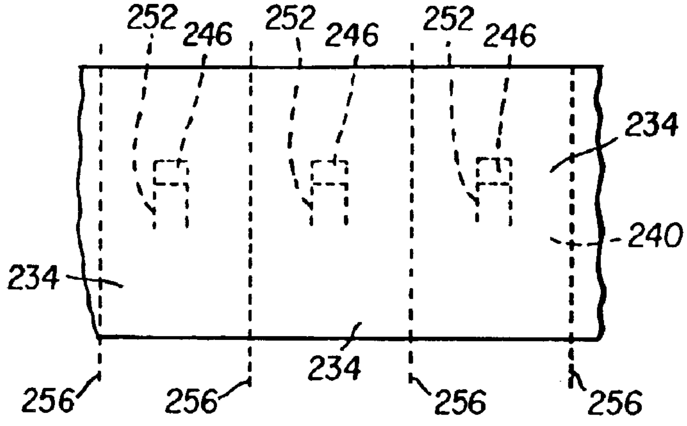
FIG. 7*b* is top plan view of a portion the web of FIG. 7*a* after it has been folded illustrating three image products that are to be separated from the web.
Figure 7C:
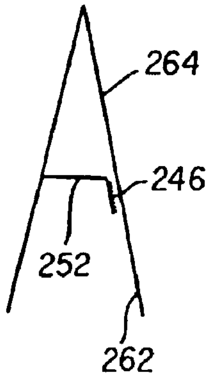
FIG. 7*c* is an end view of one of the image products of FIG. 7*b* that has been separated from the web and placed in the in use position.

FIGS. 7*a*–7*c* illustrate an alternative embodiment of a two-sided photo "tent card" 234 also made in accordance with the present invention. FIG. 7*a* shows the media web 80 prior to folding by the method and apparatus of the present invention. The web 80 has been pre-printed with images (not shown) on its reverse face 240 in areas of the web 80 which will form the outer, visible portion of the tent card 234 once it has been folded. A crease line 242 is formed in web 80 by the apparatus shown in FIGS. 2*a*–2*c*. A pressure activated adhesive has been applied in areas 246 by any of the methods disclosed previously. Three sided tabs 252 are formed in web 80 using, for example, a die cutter or the apparatus disclosed in FIGS. 11 and 11*a,* applied to the web at an earlier stage of manufacture. Using one of the methods previously disclosed, the web 80 is folded in half along crease line 242, by folding upper edge 248 over the upper face of web 80, until it meets lower edge 250, where the upper face of web 80 is that face shown in FIG. 7*a*. FIG. 7*b* shows the folded web; the die cut tabs 252 and adhesive areas 246 are shown in dotted lines as they are now under the folded over web. Lines 256 indicate where the continuous folded web 80 is cut so that the individual tent cards 234 can be produced. FIG. 7*c* shows an assembled tent card 260. The tent card 260 is assembled by manually folding the die cut tab 252 inward and manually applying pressure thereby adhering the adhesive area 246 to the inside 262 surface of the card. On the completed tent card 234, images are visible on outside surface 264.

Figure 8A:
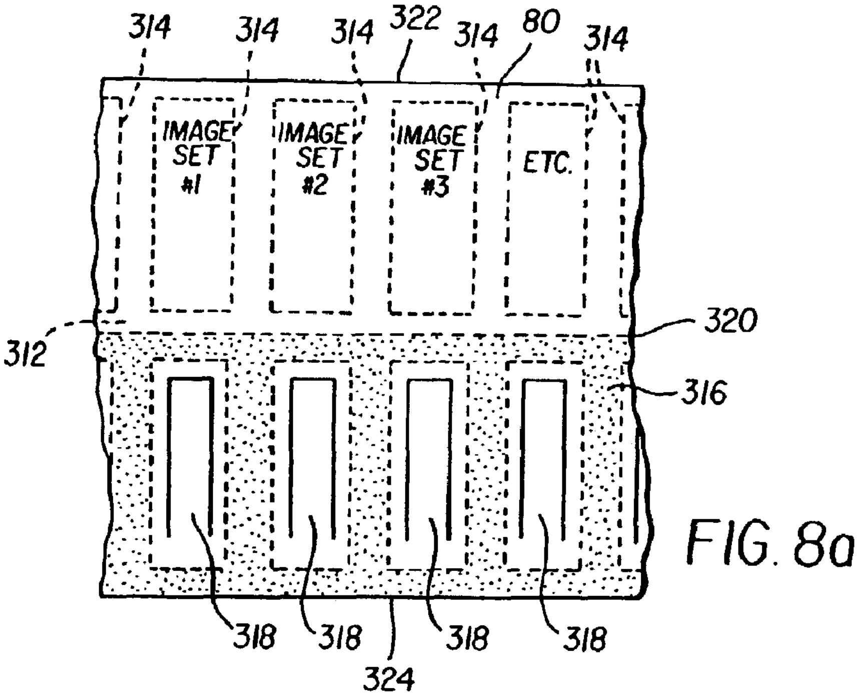
FIG. 8*a* is a view similar to FIG. 6*a* illustrating a modified web made in accordance with the present invention.
Figure 8B:
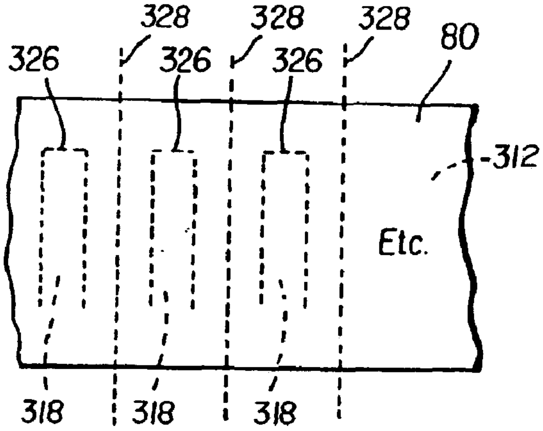
FIG. 8*b* is top plan view of a portion of the web of FIG. 8*a* after it has been folded illustrating image products that are to be separated from the web.
Figure 8C:
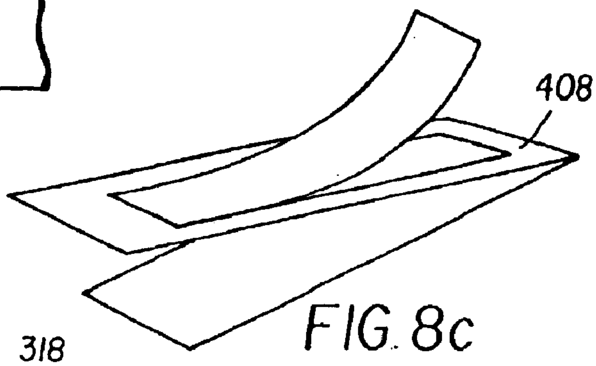
FIG. 8*c* is an end view of one of the image products of FIG. 8*b* that has been separated from the web and placed in the in use position.
Figure 8D:
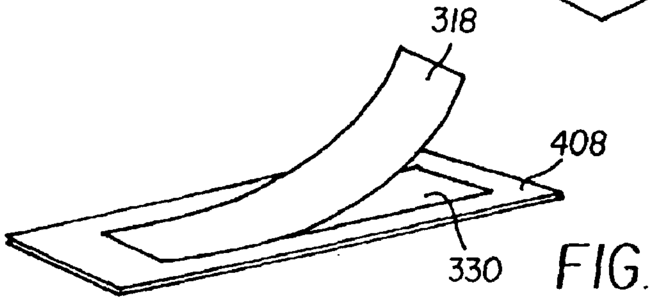
FIG. 8*d* is an end view of one of the image products of FIG. 8*b* that has been separated from the web and placed in the in use position.
Figure 9:
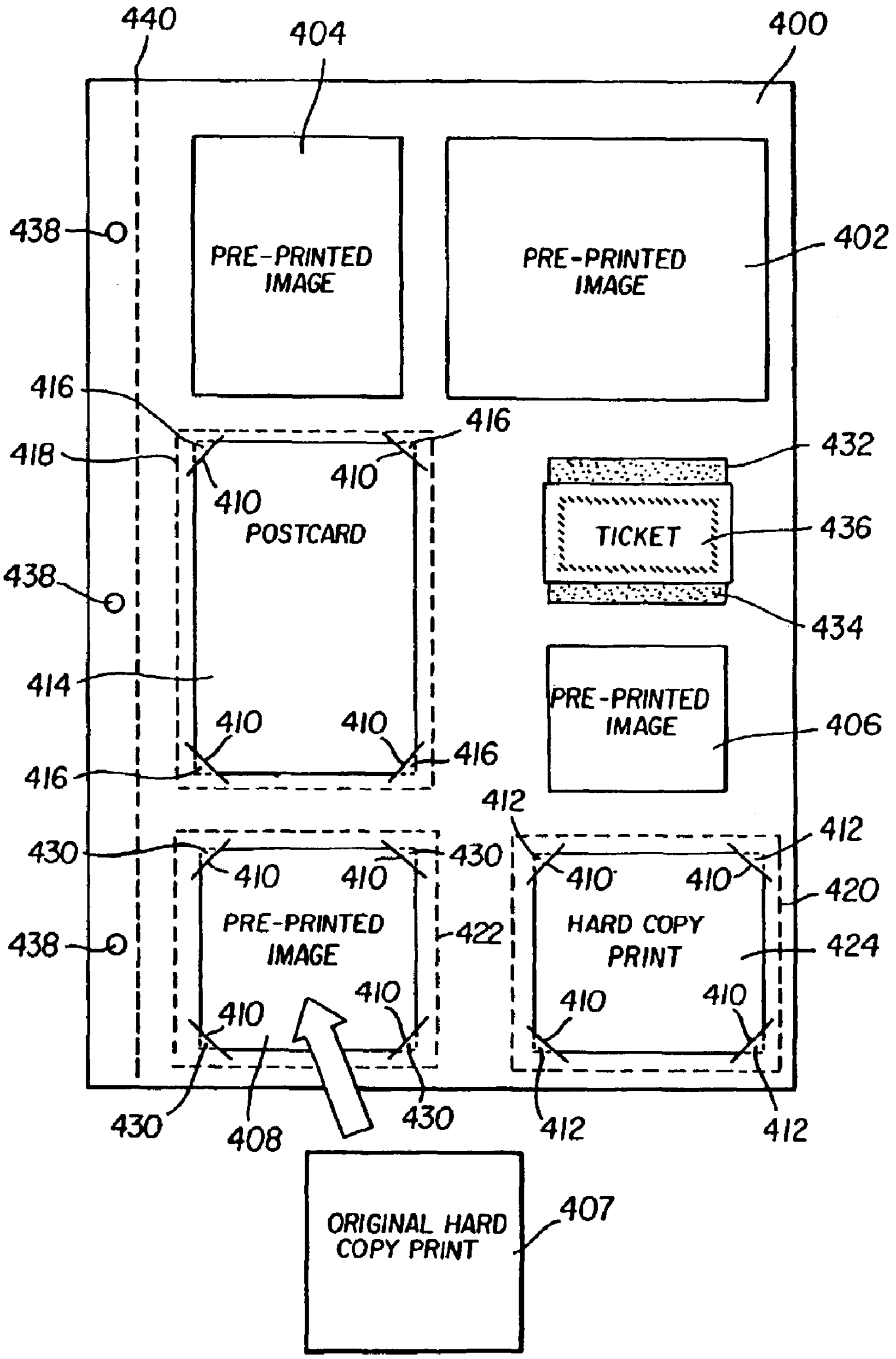
FIG. 9 illustrates a two-sided image product made in accordance with the present invention.

FIGS. 8*a*–8*b* illustrate various stages of manufacture of a two-sided photo bookmark 408 made in accordance with the method and apparatus of the present invention. In FIG. 8*a*, media web 80 is shown prior to the folding and sealing steps needed to make bookmark 408. Web 80 has been pre-printed with images on its reverse face 312 in the areas indicated by dotted rectangles 314. Adhesive is provided to the upper face of web 80 in the pattern indicated by the shaded area 316. Three-sided tabs 318 have been previously cut into the web 80 using, for example, a die cutter applied to the web at an earlier stage of manufacture. The web 80 is folded in half along line 320 using the methods already disclosed by folding edge 322 over the upper face of the web 80 until it is aligned with edge 324 and the folded web is then sealed as previously described. FIG. 8*b* shows the folded and sealed web; die cut tabs 318 are shown in dotted lines 326 as they are now under the folded over web 80. Cut lines 328 indicate where the web 80 will be cut to create the completed bookmarks 408. FIG. 8*c* shows a bookmark 408 in a partially unfolded state for the purposes of illustration and to indicate more clearly its construction. FIG. 8*d* is an perspective view of a completed bookmark 408 with the tab 318 pulled up. Tab 318 does not adhere to the back 330 of the bookmark because no adhesive has been applied there. In the embodiments of two-sided image-bearing products described thus far all images are printed digitally on a web prior to the other steps of the addition of an adhesive, making of cuts in the web, and the folding and sealing of the web to itself in various configurations. In another aspect of the present invention, it can be envisioned that at times it will be desirable to have a two sided image product which makes provision for the addition of supplemental material to the product after it has been manufactured. For example, with album pages such as those made by the apparatus of the present invention as illustrated in FIGS. 2*a*–2*d*, a user of such an album page may wish to add certain items to the page once it has been printed and folded. For example, a user may want to add to an album page an original hard copy photographic print which may not be available in digital form, or a piece of printed memorabilia such as a concert ticket, or a postcard, as is often done in the construction of a multi-media scrapbook. FIG. 9 shows one side of a two-sided photoalbum page 400 made in accordance with the present invention and which incorporates various features allowing the addition of supplemental items. The album page 400 of FIG. 9 has pre-printed images 402, 404, 406 and 408. In addition, cuts 410 have been introduced into the page 400 and positioned to allow an item such as, for example, a hard copy print 424 to be inserted and retained in the page 400 by its corners 412 or postcard 414 to be inserted and retained by its corners 416 in a like manner. The manufacture of the album page 400 depicted in FIG. 9 uses a process as previously described for the products depicted in FIGS. 6, 7 and 8. In a manner analogous to that described for these previous products, cuts 410 are made through one layer at a stage of manufacture after the pre-printing of images 402, 404, 406 and 408, but prior to the addition of adhesive and prior to folding to form the two-sided page product. Also as described earlier, cuts 410 may be made by any suitable means including, for example, die cutting, laser cutting or cutting by a numerically controlled machine such as that described in FIG. 11. Adhesive is applied in all areas of the web 80 prior to folding except those areas defined by dotted boxes 418, 420 and 422; this assures that supplemental materials such as the hard copy print 424 and postcard 414 may be easily inserted and later removed if desired with no adhesive contacting corners 412 and 416. The cuts 410 shown placed at the corners 430 of a pre-printed image 408 illustrate another variation where pre-printed image 408 is used merely to indicate where the original hard copy print 407 from which image 408 was derived is to be inserted into the album page 400. Pre-printed image 408 can also serve as a reminder of the location of print 407 should it ever be lost from the page 400. The area defined by dotted box 422 is also left free of adhesive for this latter variation. In yet another variation, area 432 is cut out so that when the page is folded, adhesive 434 is left exposed. Area 432 may then be used to add other supplemental materials into the page such as, for example, concert ticket 436, which is pressed against pressure-activated adhesive 434 and retained on the page 400. Finally, once page 400 has been folded and sealed, binder holes 438 are punched and hinge 440 is formed by embossing, using any well-known embossing technique. These latter steps of punching holes 438 and embossing hinge 440 may be performed at the cutting and finishing stage of manufacture as shown, for example, FIG. 2*a*.

Figure 12:
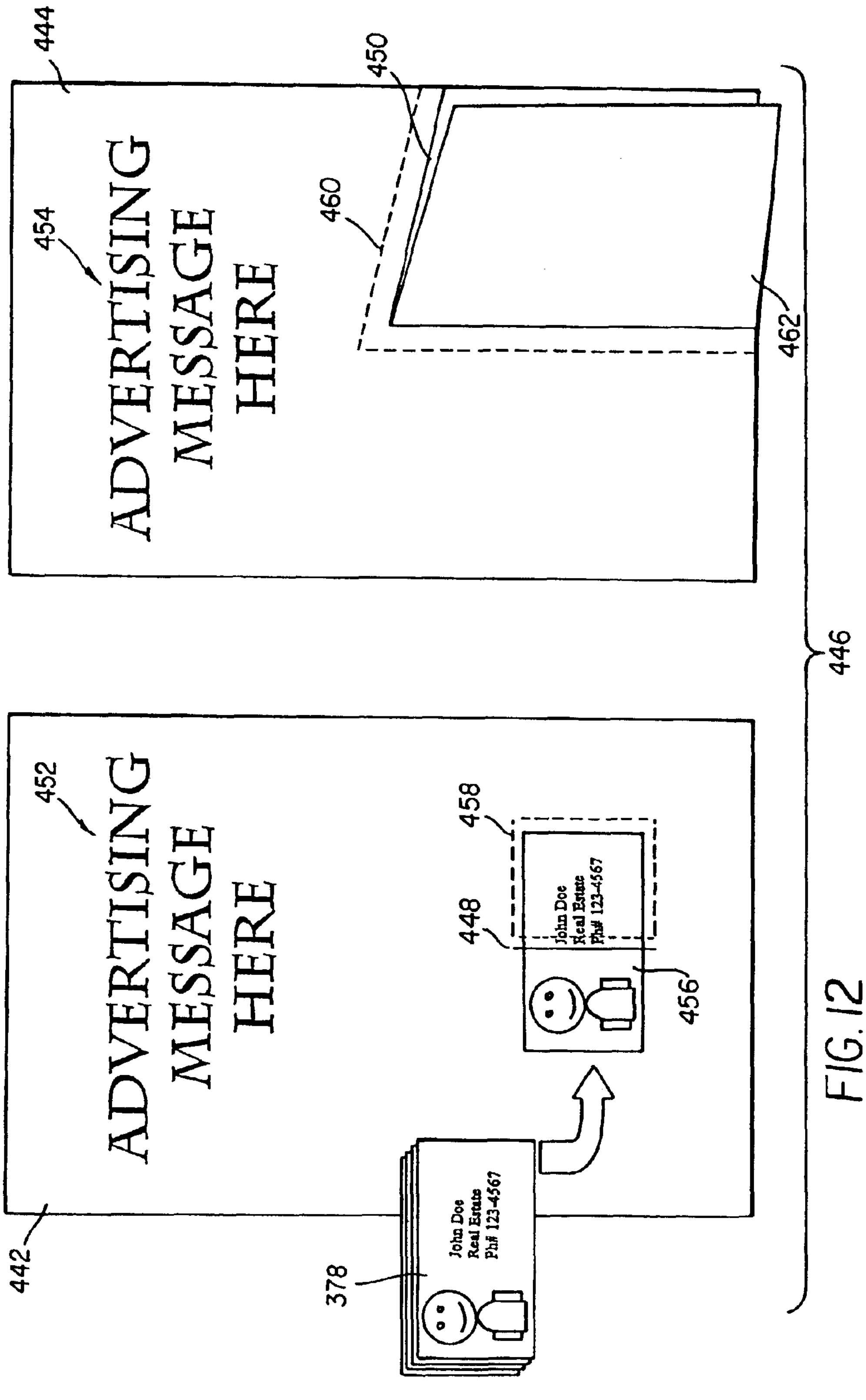
FIG. 12 illustrates another two-sided advertising display product made in accordance with the present invention.

FIG. 12 shows the front side 442 and the reverse side 444 of an advertising display 446 made in accordance with the present invention and which incorporates yet another feature allowing the addition of supplemental materials to the product. The display 446 shown in FIG. 12 is designed to hold a supply of image-bearing items, for example image bearing business cards 378, which may be removed and kept by a customer for later reference. Front side 442 has printed thereon an advertising message 452 and an image of a business card 456 which serves to indicate where business cards 378 are to be inserted; reverse side 444 may also have an advertising message 454 printed thereon. The manufacture of the display 446 depicted in FIG. 12 uses a process as previously described for the products depicted in FIGS. 6, 7, 8 and 9. In a manner analogous to that described for these previous products, a cut 448 is made through front side 442 and cut 450 is made through reverse side 444 at a stage of manufacture after the pre-printing of messages 452 and 454 and image 456, but prior to the addition of an adhesive and prior to folding to form the two-sided product. Also as described earlier, cuts 448 and 450 may be made by any suitable means including, for example, die cutting, laser cutting or cutting by a numerically controlled machine such as that described in FIG. 11. Adhesive is applied in all areas of the web prior to folding except in the areas defined by dotted areas 458 and 460. The absence of adhesive in the area defined by area 458 assures that business cards 378 may be easily inserted via cut 448 and later removed when the completed product 446 is in use. The absence of adhesive in the area defined by box 460 allows flap 462 to be unfolded from the completed display; flap 462 thus unfolded provides a brace so that the display 446 can stand alone.

In order to understand the present invention, a description of the operation of the system 10 will now be discussed. The computer 12 initially obtains orders for an image product such as an album page, tent card, etc. These orders may be obtained over a communication network such as the internet or entered manually by an operator. These orders may be obtained from a large number of different customers each ordering a customized image product. This information is properly managed by computer 12 and manipulated in accordance with the customer's order. The appropriate information is sent to printer 14 where the appropriate images are printed on a web. In addition the printer 14 prints any appropriate information, marks or other indicia that may be read and used by later components or users of system 10. Thereafter, the later components receive the web 80 and provide the appropriate processing. Appropriate information and/or instruction are forwarded to these components by computer 10. For example, the web 18 may be sent to adhesive applicator 17 where an adhesive coating is applied prior to the web being forwarding to apparatus 18 if the adhesive is not applied by apparatus 18. The adhesive may be selectively applied to designated areas for providing unique image products in accordance with the customer's order. Also the web may be sent to die cutter 16 for providing appropriate cuts in the web that may used in the finished image goods. Hereagain, computer 12 will provide appropriate information and/or instructions which allows for providing of custom image products. Alternatively, the web 80 may be sent directly to device 18 where an adhesive web is applied to the web 80, the web 80 folded and cut to provide the appropriate finished image goods. As discussed above, a removable label may be provided that is attached to the finished goods. These labels may be used for collating the customer orders and/or for the returning the goods to the customers. It can be seen that the above system may provide multitude different customized image products for numerous different customers each potentially located at different locations.

The invention has been described in detail with particular reference to certain preferred embodiments thereof, but it will be understood that variations and modifications can be effected within the scope of the invention.

Parts List

10 manufacturing system
12 computer
14 digital printer
16 die cutter
17 adhesive applicator
18 folder/cutter/sealer
20 image source
24 print media
30 internet
32 remote location
34 remote location
36 remote location
38 remote location
40 internet service provider
41 frame
42 processing path
44 entrance
46 exit
48 transport roller
50 transport roller
52 transport roller
54 transport roller
56 guide roller pair
58 guide roller pair
55 folding roller pair
60 guide roller pair
62 guide roller pair
64 guide roller pair
65 folding roller pair
66 guide roller pair
68 folding section
70 drive rollers
72 sealing rollers
75 cutter
80 media web
81 image-bearing side
82 non-image-bearing side
84 adhesive area
85 creasing roller
90 adhesive web
91 die
94 application roller
95 folding section
97 crease line
98 web section
99 web section
101 arrow
104 guide flange
105 cut sheets
106 creasing mechanism
108 creasing roller
109 die
110 creasing roller
111 die
113 die
112 creasing roller
115 channel mouth
116 crease line
117 crease line
118 crease line
131 perforations
132 two-sided album page
133 removable segments
134 pre-printed image
150 guide channel
152 channel mouth
154 flange
160 inner surface
180 cutter system
182 plotter
184 pen carrier
185 knife pen
186 computer
187 knife blade
189 shaft
190 pen barrel
192 cutting point
196 center line
198 reverse face
200 adhesive area
202 edge
204 upper face
205 bookmark
206 crease line
208 crease line
210 crease line
212 crease line
214 edge
216 fold
218 fold
220 fold
222 fold
232 cutting line
234 tent card
236 tent card
238 base
240 reverse face

242 crease line
246 adhesive area
248 edge
250 edge
252 tab
256 cutting line
260 assembled tent card
262 inside surface
264 outer surface
312 reverse face
314 rectangular area
316 adhesive area
318 tab
320 crease line
322 edge
324 edge
326 tab cut line
328 cut line
330 bookmark back
378 business cards
400 photoalbum page
402 preprinted image
404 preprinted image
406 preprinted image
407 hard copy print
408 preprinted image
410 cut
412 corner
414 postcard
416 corner
418 defined area
420 defined area
422 defined area
424 hard copy print
430 corner
432 cut area
434 adhesive
436 ticket
438 binder hole
440 hinge
446 image product
442 front side
444 reverse side
446 advertising display
452 advertising message
454 advertising message
456 image
448 cut
450 cut
458 defined area
460 defined area
462 flap

What is claimed is:

1. An apparatus for manufacture of a two-sided image product, comprising:

a transport device for moving a web of media in a direction longitudinal to said web, said web having an image bearing side and a non-image bearing side with a plurality of undetermined images printed on said image bearing side, and said non-image bearing side having an adhesive thereon;

a device for applying adhesive to said non-image bearing side of said web of media:

a creasing device for forming a crease line on said web of media, said crease running in said longitudinal direction along said web; and a folding device for folding said web of media along said crease so that said non-image bearing side contacts itself so as to adhere said non-image bearing side to itself wherein said folding mechanism comprises a plurality of adjacent rollers that progressively come together so as to fold said web so that said non-image bearing side contacts itself so as to adhere said non-image bearing side to itself.

2. The apparatus of claim 1 further comprising a device for pre-cutting said web of media in certain areas.

3. The apparatus of claim 2 wherein said device for pre-cutting said web of media comprises a die cutter.

4. The apparatus of claim 2 wherein said device for pre-cutting said web of media comprises a laser cutter.

5. The apparatus of claim 2 wherein said device for pre-cutting said web of media comprises a numerically controlled plotter fitted with a knife pen.

6. The apparatus of claim 1 wherein said device for applying adhesive further comprises a coater for coating said adhesive on said web of media.

7. The apparatus of claim 1 wherein said device for applying adhesive further comprises a tacker for tacking an adhesive sheet to said web of media.

8. The apparatus of claim 7 further comprising a device for pre-cutting said adhesive sheet prior to tacking said adhesive sheet to said web of media.

9. A system for making customized two sided image products for a plurality of customers, comprising:

a computer for coordinating a plurality of customer orders for custom image products having image content;

a digital printer for printing said image content of said customer orders on an image bearing side of a web of media, said web having a non-image bearing side;

an adhesive applying mechanism for applying an adhesive on said non-image bearing side of said web;

a folding mechanism for folding said web such that said non-image bearing side contacts itself as the web moves longitudinally along its length, wherein said folding mechanism comprised a plurality of adjacent rollers that progressively come together so as to fold said web; and a cutting mechanism for cutting said folded web for separating said custom image products from said web.

10. A system according to claim 9 wherein said adhesive mechanism, said folding mechanism and said cutting mechanism are provided in a single apparatus.

11. A system according to claim 9 further comprising a cutting device for providing cuts in said web prior to folding of said web that are to be used in custom product.

12. A system according to claim 9 wherein a creasing mechanism is provided for provided at least one crease about which said web is to be folded.

* * * * *